United States Patent [15] 3,638,703
Endter et al. [45] Feb. 1, 1972

[54] HEAT STABLE POLYESTER CORD REINFORCED RUBBER STRUCTURE

[72] Inventors: Norman G. Endter, 5 Rue Albert Roze, Amiens 80, France; Frank J. Jenkins, 564 Alandale Drive, Tallmadge, Ohio 44278

[22] Filed: Jan. 29, 1968

[21] Appl. No.: 701,093

[52] U.S. Cl. .............................152/330, 156/110 A, 161/57, 161/144, 260/248.5
[51] Int. Cl. .........................................B60c 1/00, B29h 5/01
[58] Field of Search ......................156/110 A; 161/144, 231; 152/357, 359, 330

[56] References Cited

FOREIGN PATENTS OR APPLICATIONS 1,483,340    4/1967    France...............................156/110 A Primary Examiner—Leland A. Sebastian
Attorney—F. W. Brunner and Vernon G. Parker

[57] ABSTRACT

Polyester cord reinforced rubber structures such as pneumatic tires are protected against heat degradation by the use of an acid reaction product of a methylene donor such as hexamethylenetetramine in combination with a methylene acceptor such as resorcinol.

9 Claims, No Drawings

HEAT STABLE POLYESTER CORD REINFORCED RUBBER STRUCTURE

This invention relates to a heat stable polyester cord reinforced rubber structure wherein the rubber is treated with a methylene acceptor and the acid reaction product of a methylene donor, particularly hexamethylenetetramine.

It is well known to use rubber in many structures including the manufacture of pressure hose, drive belts, and pneumatic tires. When rubber is used in this manner it is necessary to reinforce the rubber with a nonrubber reinforcing element made of such material as rayon, nylon, polyester, wire, polycarbonate, and glass fibers. Maximum reinforcement of the rubber is obtained when maximum adhesion is produced between the rubber and the reinforcing element. Polyester is a particularly desirable material to use, but it has been observed that in the environment of, for example, a pneumatic tire, the heat generated under high speed and particularly when combined with heavy loads will cause degradation of the polyester.

The chemical environment of a pneumatic tire is complex because many different chemicals are needed in its construction in order to obtain maximum performance of the rubber in the tire. For example, the rubber can be compounded with many chemicals including methylene acceptors such as resorcinol and methylene donors such as hexamethylenetetramine. This combination of acceptor and donor is believed to react to form a resin in situ, which resin aids in the development of a satisfactory bond between the polyester cord and the rubber. It has been observed that the methylene donor, hexamethylenetetramine, causes degradation of the polyester cord at elevated temperatures. A solution to this problem becomes difficult in view of the complex chemistry involved in the present day formulations used in the production of, for example, a pneumatic tire.

It has now been discovered that hexamethylenetetramine may continue to be used in a pneumatic tire without the undesirable side effects of cord degradation when the hexamethylenetetramine is first reacted with an acid to form a product which is then used in place of the hexamethylenetetramine donor in the donor/acceptor combination.

The acid reaction product of hexamethylenetetramine is made in the following conventional manner:

EXAMPLE 1

A. FOR GASEOUS ACIDS (e.g., HCl and $BF_3$)

A dilute solution of hexamethylenetetramine in $CHCl_3$ was prepared. The gaseous hydrochloric acid was bubbled through the solution until reaction was complete. The acid, boron trifluoride, may be used in the same way. The reaction product precipitated and was filtered, washed with $CHCl_3$ and dried.

B. FOR LIQUID ACIDS (e.g., 85 percent $H_3PO_4$ and conc. $H_2SO_4$)

A saturated solution of hexamethylenetetramine in 2-propanol was prepared. An equimolar amount of phosphoric acid was added to the solution. Sulfuric acid may be used in the same way. The reaction product precipitated and was filtered, washed with 2-propanol and dried.

C. FOR SOLID ACIDS e.g., toluenesulfonic acid and fumaric acid)

A saturated solution of hexamethylenetetramine in 2-propanol was prepared. An equimolar amount of a concentrated solution of toluene sulfonic acid in 2-propanol was added to the first solution. Fumaric acid may be used in the same way. The reaction product precipitated and was filtered, washed with 2-propanol and dried.

All of the reaction products noted above are white, crystalline solids soluble in water.

Any acid reactable with hexamethylenetetramine to form a reaction product therebetween may be used. Inorganic acids which may be used include hydrochloric, sulfuric, phosphoric, and such Lewis acids as boron trifluoride. Organic acids that may be used include toluene sulfonic acid, benzene sulfonic acid, ethyl benzene sulfonic acid, ortho-, meta-, and para-toluene sulfonic acids and their mixtures, and other alkyl (1-12C) substituted benzene sulfonic acids and fumaric acid. These acids form a reaction product with hexamethylenetetramine when caused to react with hexamethylenetetramine under the general conditions indicated in example 1A, 1B, or 1C above.

The heat stable polyester cord reinforced rubber construction of this invention may be made in accordance with the following example.

EXAMPLE 2

A rubber to cord construction was made by embedding a polyester cord in rubber. The polyester cord used in this example is made by first twisting 1,100-denier yarn at the rate of 12 turns per inch and then twisting three of these singles at the rate of 12 turns per inch to form a cord. The yarn is made of polyethylene terephthalate filaments having a melting point of 260° C. and an intrinsic viscosity of 0.68.

The polyester cord is treated with rubber made and compounded in accordance with the following formula:

| | Ingredients | Parts by weight— Amount used | May be used |
|---|---|---|---|
| 1 | Natural rubber | 70 | 0-100 |
| 2 | OE/SBR 1778 (styrene/butadiene-1,3 23.5/76.5 copolymer) (plus 37½ parts oil per 100 SBR) | 27.5 | 100-0 |
| 3 | Cis 1,4-polybutadiene | 10 | 0-50 |
| 4 | Carbon black (reinforcing agent) | 40 | 25-100 |
| 5 | Zinc oxide (activator of cure) | 4 | 2-10 |
| 6 | Stearic acid (activator of cure) | 2 | 1.5-3.0 |
| 7 | Primary accelerator (2,2'-dithiobisbenzothiazole) | 1.25 | .5-3.0 |
| 8 | Pine oil (softener) | 10 | 2-50 |
| 9 | Secondary accelerator (tetramethylthiuram disulfide) | .10 | .05-1.0 |
| 10 | Antioxidant (hindered phenol) | .60 | .1-4 |
| 11 | Sulfur (vulcanizing agent) | 2.5 | 1.0-5.0 |
| 12 | Methylene acceptor (resorcinol) | .75 | .5-5.0 |
| 13 | Methylene donor (acid reaction product of hexamethylenetetramine—acid used as noted) | 1.50 | .5-5.0 |

In compounding the rubber stock in accordance with the formulation set forth above a master batch of ingredients 1 and 2 are made with the carbon black and mixed on a mill to a temperature of about 110° C. and may be mixed at a temperature as high as 140° C. The resulting carbon black master batch is then cooled and the remaining compounds are mixed into the batch in the order indicated above to a temperature of about 70° C. and may be mixed at a temperature as high as 100° C. The control rubber was prepared in a similar manner except that the methylene donor was hexamethylenetetramine.

The polyester cord tensile retention was measured by aligning the polyester cord on the top of a sheet of the rubber made as noted above and the results reported below under the noted variations and then covering the cord with a sheet of calender cloth subjecting the assembly to cure as noted below. The cords were then removed from the rubber and placed in a tensile-testing machine to measure the retained tensile. The grey cord had a tensile of 43 pounds, and when heated alone in an inert atmosphere for 3 hours at 350° F. had a tensile of 35.4 pounds. The following table shows the results that may be obtained in the practice of the present invention:

TABLE I.—GREY POLYESTER CORD ASSOCIATED WITH RUBBER

| Experiment | Acceptor | Donor | Cord tensile [1] |
|---|---|---|---|
| 2 | Resorcinol | Hexamethylenetetramine (control) | 32.4 |
| 3 | do | Hexamethylenetetramine/toluene sulfonic acid | 35.4 |
| 4 | do | Hexamethylenetetramine/fumaric acid | 37.0 |
| 5 | do | Hexamethylenetetramine/hydrochloric acid | 36.8 |
| 6 | do | Hexamethylenetetramine/phosphoric acid | 33.4 |
| 7 | do | Hexamethylenetetramine/sulfuric acid | 41.6 |
| 8 | m-Aminophenol | Hexamethylenetetramine/boron trifluororide | 39.4 |

[1] After 3 hours at 350° F., pounds.

In the examples in the table above each of the methylene donors will produce a desirable bond between the surface of the polyester cord and the rubber. It has also been observed that the methylene donors react favorably in the rubber to improve the physical properties of the rubber such as the 300 percent modulus, the ultimate tensile strength, the elongation, the hot rebound, the hot deflection, dynamic modulus, and of most importance, without degrading the physical properties of the polyester cord being bonded to the rubber, especially after heat aging.

The polyester fiber used in making the reinforcing cord used in making the rubber construction of this invention is preferred because of the quality of high strength possessed by the fiber even at high temperatures with little tendency to stretch as is the characteristic of other synthetic manmade fibers such as the polyamides. The reinforcing fibrous structures used in this invention are prepared from a fiber forming thermoplastic linear high-molecular weight condensation polyester and those made particularly from polyethylene terephthalate as well as polymer of cyclohexanedimethylene terephthalate. By linear terephthalate polyesters is meant a linear condensation polyester comprising recurring glycol dicarboxylate structural units in which at least about 85 percent of the recurring structural units are units of the formula

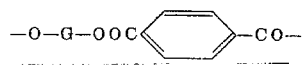

wherein G represents a divalent organic radical containing from about two to about eight carbon atoms which is attached to the adjacent oxygen atoms by saturated carbon atoms. The terephthalate radical may be the sole dicarboxylate constituent of the recurring structural units or up to about 15 percent of the structural units may contain other dicarboxylate radicals such as adipate, sebacate, isophthalate, 4,4' bibenzoate and hexahydroterephthalate. By high molecular weight is meant polyesters having an intrinsic viscosity of at least 0.4 and preferably 0.6 to 1.0 and as high as 1.5 as measured in a 60/40 phenol/tetrachlorethane mixed solvent at 30° C. Dacron T68 is an example of a commercially available polyester fiber which is a high-melting, high molecular weight, high tensile strength polyester, made of polyethylene terephthalate having an intrinsic viscosity of 0.85. In preparing the linear terephthalate polyester filaments useful in this invention and particularly best suited for reinforcing rubber through the formation of the in situ resins described herein, the filaments are preferred to have a free carboxyl group concentration of less than about 65 equivalents per million grams of polyester and preferably less than about 20 equivalents. It is preferred that the polyethylene terephthalate and other similar polyesters have a high melting point which for polyethylene terephthalate is about 265° C. measured with a hot stage polarizing microscope. Generally the polyester fibers of this invention may be prepared in accordance with well-known procedures for melt extrusion and drafting.

The rubber component of the rubber construction of this invention may be any rubber that is a stretchable composition having a tendency to return to its approximate original shape after being vulcanized, and particularly any rubber that is used in the manufacture of tires, drive belts, or pressure hose. Thus, the laminate of this invention may involve natural rubber otherwise known as Hevea Brasiliensis, or conjugated diene polymeric rubbers made by polymerizing butadiene-1,3 isoprene, 2,3-dimethyl butadiene-1,3 and mixtures of these conjugated dienes as well as copolymers of these diene monomers with up to 50 percent of compounds which contain a $CH_2 \;\; C$ group and which are copolymerizable with butadiene-1,3 where, for example, at least one of the valences is attached to an electra negative radical, that is a radical which increases the polar character of the molecule such as vinyl, phenyl nitrile and carboxy radicals. Examples of the diene rubbers are polybutadienes including the stereospecifics, polyisoprenes including the stereospecifics, butadiene/styrene copolymers, also known as SBR, and butadiene/acrylonitrile copolymers also known as NBR.

The rubber being bonded to the polyester elements in the presence of an in situ resin will contain conventional compounding and vulcanizing ingredients such as carbon black, antioxidants, sulfur, zinc oxide, accelerators, and rubber processing and softening oils which may be added as such or may be prepared from oil-extended rubbers.

The rubber structure of this invention may be prepared by first coating a reinforcing fabric with the rubber and then using the rubber-coated fabric to make any desired structure as, for example, a pneumatic tire. The rubber will be compounded in the manner set forth above. The reinforcing fabric may be used without any previous treatment, and under these conditions the fabric is known as greige cord indicating that no treatment in the form of an adhesive composition has been applied to the surface of the cord. Thus, the present invention may be used in the manufacture of a pneumatic tire of conventional present day design as shown, for example, in such U.S. Pat. Nos. as 3,157,218; 3,160,191; 3,160,192; 3,217,778; 3,225,810; 3,225,812; 3,244,215; 3,253,633 and 3,253,638 all of which show a vulcanized rubberized fabric carcass of generally torodial shape having a tread portion superimposed and bonded to the crown area of the carcass and plies of rubberized fabric forming sidewalls extending from the tread over the carcass to the bead portion.

Each of the methylene donors described above will react to form a resin in situ in the rubber when reacted with any one or combination of the following methylene acceptors; resorcinol, m-aminophenol, resorcinol monoacetate, resorcinol diacetate and other m-disubstituted benzenes wherein the substituents may be hydroxyl (-OH), amino(-$NH_2$) or acetoxy (OCOC$H_3$) radicals; as well as 1,5 naphthalenediol, phenol, alpha and beta naphthol resins resulting from the partial reaction of the foregoing acceptors with formaldehyde. Other acceptors include melamine and phenols such as resorcinol, and m-aminophenol, and partial reaction products with urea, aniline and m-phenylenediamine. Adhesion to the greige cord may be further improved if the cord is previously treated with conventional cord adhesives by passing the cord through an adhesive dip of an aqueous dispersion of a mixture comprising a phenol, an aldehyde and a rubber latex. The mole ratio of acceptor to donor may range from the stochiometric to 1 to 6.

The rubber compositions containing the combination of methylene acceptors and donors of the type disclosed herein are particularly useful in the manufacture of pneumatic tires, pressure hose, and drive belts, wherein the rubber is subjected to severe forces to the extent that the rubber must be reinforced with a rubber-reinforcing agent and the instant invention permits the use of polyester-reinforcing agents which possess physical properties far superior to other reinforcing agents, particularly of the rayon and nylon type.

While certain representative embodiments and details have been shown for the purpose of illustrating the invention, it will be apparent to those skilled in this art that various changes and modifications may be made therein without departing from the spirit or scope of the invention.

What is claimed is:

1. In a heat stable structure comprising a polyester cord and rubber, the improvement which comprises compounding the rubber with a methylene acceptor and as a donor, an acid reaction product of hexamethylenetetramine.

2. The structure of claim 1 wherein the acid is selected from the group consisting of toluene sulfonic acid, benzene sulfonic acid, ethyl benzene sulfonic acid, a mixture of ortho, meta, and para toluene sulfonic acids, hydrochloric acid, phosphoric acid, sulfuric acid, fumaric acid, and boron trifluoride.

3. The structure of claim 2 wherein the acceptor is selected from the group consisting of resorcinol, and resorcinol diacetate.

4. The structure of claim 3 wherein the donor is the reaction product of a mixture of ortho, meta, and para toluene sulfonic acids and hexamethylenetetramine.

5. The structure of claim 4 wherein the acceptor is selected from the group consisting of resorcinol and resorcinol diacetate.

6. In a pneumatic tire including a carcass of generally toroidal shape having a plurality of plies of polyester tire cord fabric embedded in rubber, the improvement which comprises compounding the rubber with a methylene acceptor and, as a donor, an acid reaction product of hexamethylenetetramine.

7. The tire of claim 6 in which the acid is selected from the group consisting of toluene sulfonic acid, benzene sulfonic acid, ethyl benzene sulfonic acid, a mixture of ortho, meta, and para toluene sulfonic acids, hydrochloric acid, phosphoric acid, sulfuric acid, fumaric acid, and boron trifluoride.

8. The tire of claim 6 in which the acceptor is selected from the group consisting of resorcinol and resorcinol diacetate.

9. The structure of claim 3 wherein the acceptor and acid reaction product are present in a mole ratio of from the stochiometric to 1 to 6.

* * * * *